Patented May 19, 1925.

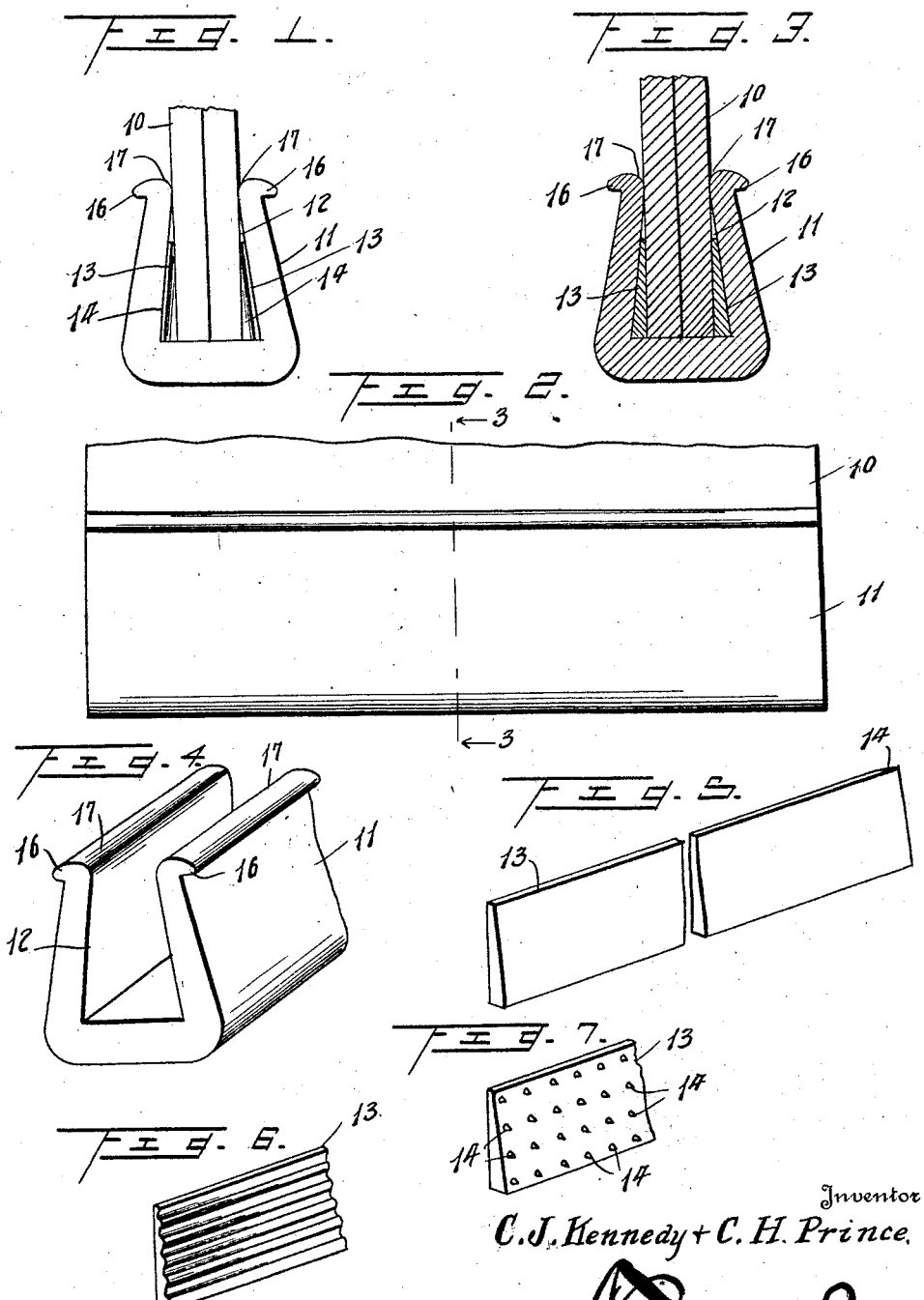

1,538,705

UNITED STATES PATENT OFFICE.

CLYDE J. KENNEDY AND CARL H. PRINCE, OF NEWKIRK, OKLAHOMA; SAID PRINCE ASSIGNOR OF HIS ENTIRE RIGHT TO CARY R. EDMONDSON, OF COUNTY OF OSAGE, OKLAHOMA.

BELT CLAMP.

Application filed May 20, 1924. Serial No. 714,659.

*To all whom it may concern:*

Be it known that we, CLYDE J. KENNEDY and CARL H. PRINCE, citizens of the United States, residing at Newkirk, in the county of Kay and State of Oklahoma, have invented certain new and useful Improvements in Belt Clamps; and we do hereby declare the following to be a full, clear, and exact description of the invention, such as will enable others skilled in the art to which it appertains to make and use the same.

This invention relates to a clamp designed to connect the ends of a drive belt or the like.

It is aimed to particularly provide a boltless construction, one in which the ends of the belt are securely wedged in place against danger of slippage, and one which requires less time for connection to the belt. As well, it is aimed to generally improve and provide an inexpensive and efficient construction.

Additional objects and advantages will become apparent from a consideration of the description following taken in connection with accompanying drawings illustrating an operative embodiment.

In said drawings:—

Figure 1 is a view showing the ends of the belt connected or clamped by my improvements, the latter being shown in end elevation;

Figure 2 is a view of the same parts with the clamps shown in side elevation;

Figure 3 is a sectional view taken on the line 3—3 of Figure 2 and passing through the fastening keys;

Figure 4 is a perspective view of the channel member of the clamp alone;

Figure 5 is a detail perspective view of one of the keys;

Figure 6 is a perspective view of a modified form of key, and

Figure 7 is a perspective view of a second modified form of key.

Referring specifically to the drawings, ends of a belt to be connected are suggested at 10.

The clamp has a channel body 11 of suitable size and appropriately proportioned. The channel of this body is designated 12 and is preferably dovetailed in cross section, having its widest portion at the closed end of the channel.

The ends 10 are adapted for disposition in the channel 12 and to be secured in place therein by means of wedge keys 13 fitting between the side walls of the body and the ends 10. The wedge keys 13 at one end may be tapered as at 14 to facilitate threading of the wedge keys into the channel from one end thereof.

As a result of the construction described, any strain on the ends of the belt pulling them away from the channel or slot 12 will correspondingly move the wedge keys 13 and the same, due to the dovetail form of the slot, will have an inward cam action so as to more tightly compress the ends 10 together and prevent their removal.

A modified form of the wedge keys is shown in Figure 6 where the same may be corrugated as shown so as to more securely bind in place.

A second modified form of the wedge key is shown in Figure 7 and in that instance, the wedge keys have spurs 14 of any suitable number which are adapted to penetrate the ends 10 to more securely fasten the wedge keys in place. The wedge keys of Figures 6 and 7 are used in exactly the same manner as those at 13.

The upper ends of the side walls of the body may be provided with outwardly extending reenforcing and belt-guiding flanges 16 and the adjacent surfaces may be rounded as at 17 to facilitate insertion of the ends 10.

Changes may be resorted to provided they fall within the spirit and scope of the invention.

What is claimed is:

A belt clamp consisting of a channeled body having its channel of dovetail shape and its wider end closed, wedges disposed in the channel and coacting with the inclined walls thereof to bind the ends of the belt together, the side walls of the body having outwardly extending flanges at their distal edges.

In testimony whereof we affix our signatures in presence of two witnesses.

CLYDE J. KENNEDY.
CARL H. PRINCE.

Witnesses:
KATHRYN SPARROW,
R. O. LEONARD.